(12) United States Patent
Barkhoff

(10) Patent No.: US 11,214,016 B2
(45) Date of Patent: Jan. 4, 2022

(54) DEVICE FOR THERMALLY WELDING PLASTIC PARTS, AND ASSEMBLY CONTAINING A DEVICE OF THIS KIND

(71) Applicant: Roland Barkhoff, Mannheim (DE)

(72) Inventor: Roland Barkhoff, Mannheim (DE)

( * ) Notice: Subject to any disclaimer, the term of this patent is extended or adjusted under 35 U.S.C. 154(b) by 0 days.

(21) Appl. No.: 16/762,861

(22) PCT Filed: Nov. 12, 2018

(86) PCT No.: PCT/EP2018/080896
§ 371 (c)(1),
(2) Date: May 8, 2020

(87) PCT Pub. No.: WO2019/096725
PCT Pub. Date: May 23, 2019

(65) Prior Publication Data
US 2021/0016517 A1 Jan. 21, 2021

(30) Foreign Application Priority Data

Nov. 14, 2017 (DE) .......................... 102017010550.3

(51) Int. Cl.
*B29C 65/00* (2006.01)
*B29C 65/10* (2006.01)
(Continued)

(52) U.S. Cl.
CPC ...... *B29C 66/00141* (2013.01); *B29C 65/103* (2013.01); *B29C 65/1412* (2013.01);
(Continued)

(58) Field of Classification Search
CPC ........ B29C 66/00141; B29C 66/73921; B29C 66/83221; B29C 66/91935; B29C 65/1467; B29C 65/7802; B29C 65/7841
See application file for complete search history.

(56) References Cited

U.S. PATENT DOCUMENTS 5,151,149 A * 9/1992 Swartz .............. B29C 66/83411
156/379.8
5,196,667 A * 3/1993 Gammelin ......... H05K 13/0486
219/85.12
(Continued)

FOREIGN PATENT DOCUMENTS

CN 102935719 B 4/2015
DE 1001930 A1 10/2001
(Continued)

OTHER PUBLICATIONS

ISR with written opinion, dated Feb. 1, 2019 (English Translation).
(Continued)

*Primary Examiner* — Daniel McNally
(74) *Attorney, Agent, or Firm* — Tod Melgar; Jason Plotkin

(57) ABSTRACT

A device for thermally welding workpieces including a heating element and a shielding gas supply is provided. The device includes a heating plate consisting of a thermal insulating material in which a groove is formed, said groove includes a heating element, relative to which a surface of a workpiece to be welded is positioned in close proximity to the heating element. A feed channel for a shielding gas is formed in the heating plate and communicates with the groove via at least one through-channel, and the feed channel for supplying shielding gas can be connected to a shielding gas source via a feed line and a valve. The device may further include an assembly for welding a first and a second workpiece, said assembly includes a first and second movement device for moving the workpieces towards one another.

16 Claims, 13 Drawing Sheets

(51) Int. Cl.
*B29C 65/14* (2006.01)
*B29C 65/72* (2006.01)
*B29C 65/78* (2006.01)

(52) U.S. Cl.
CPC ...... *B29C 65/1432* (2013.01); *B29C 65/1467* (2013.01); *B29C 65/72* (2013.01); *B29C 65/7802* (2013.01); *B29C 65/7841* (2013.01); *B29C 66/1142* (2013.01); *B29C 66/5221* (2013.01); *B29C 66/73921* (2013.01); *B29C 66/83221* (2013.01); *B29C 66/91935* (2013.01)

(56) References Cited

U.S. PATENT DOCUMENTS

| | | | | |
|---|---|---|---|---|
| 5,296,666 A | * | 3/1994 | Varadan | H05B 6/80 219/696 |
| 5,782,980 A | * | 7/1998 | Allen | C23C 16/452 118/666 |
| 2010/0147459 A1 | | 6/2010 | Bauer et al. | |
| 2019/0084245 A1 | * | 3/2019 | Cathcart | B29C 66/73921 |

FOREIGN PATENT DOCUMENTS

| | | |
|---|---|---|
| DE | 102007026163 A1 | 12/2008 |
| EP | 1415789 A1 | 5/2004 |
| JP | 08159484 A * | 6/1996 |

OTHER PUBLICATIONS

ISR with written opinion, dated Feb. 1, 2019, p. 11.
English abstract for EP1415789B1, May 6, 2004, p. 1.
English abstract for DE10019300A1, Oct. 31, 2001, p. 1.
English abstract for CN102935719B, Apr. 29, 2015, p. 1.

* cited by examiner

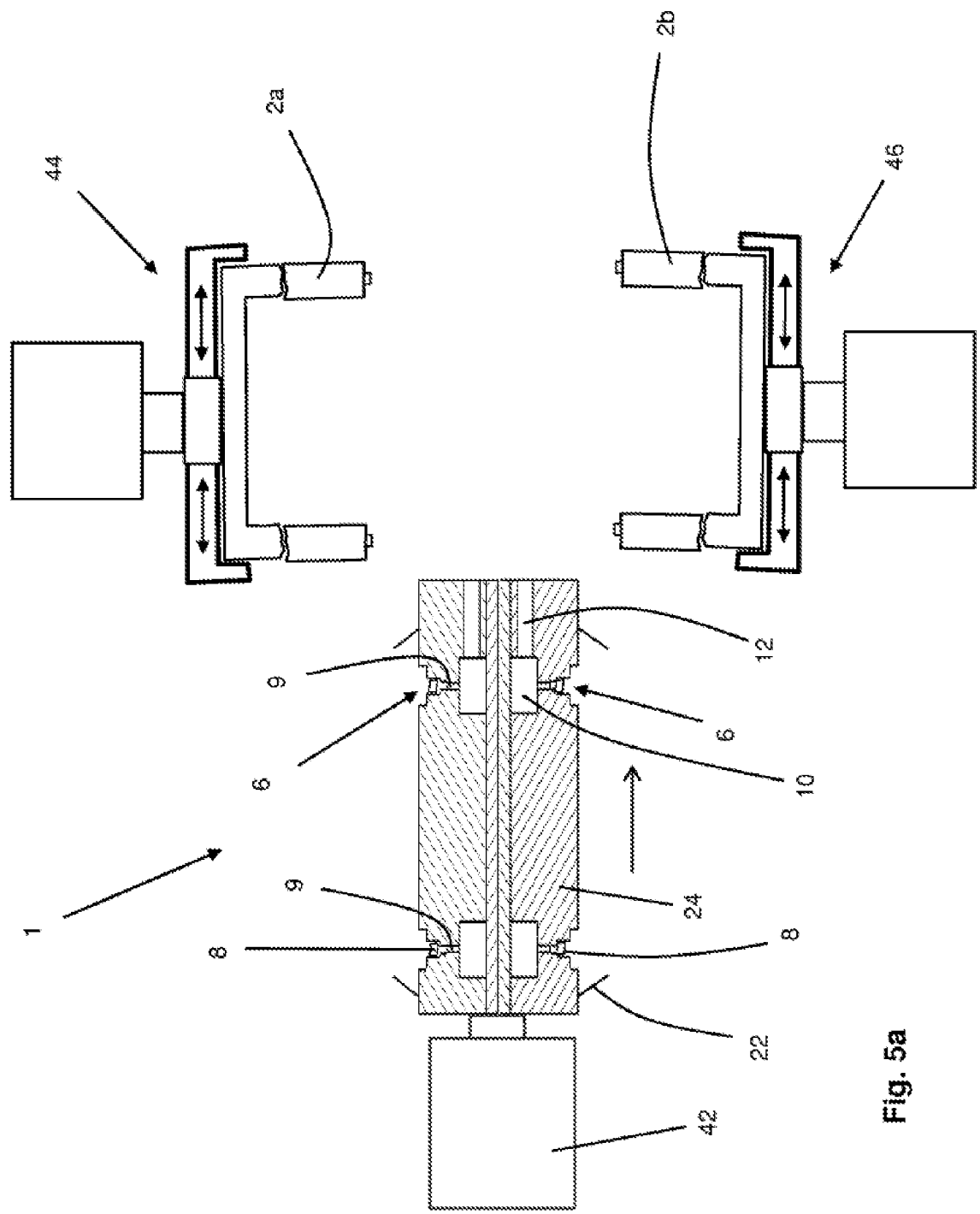

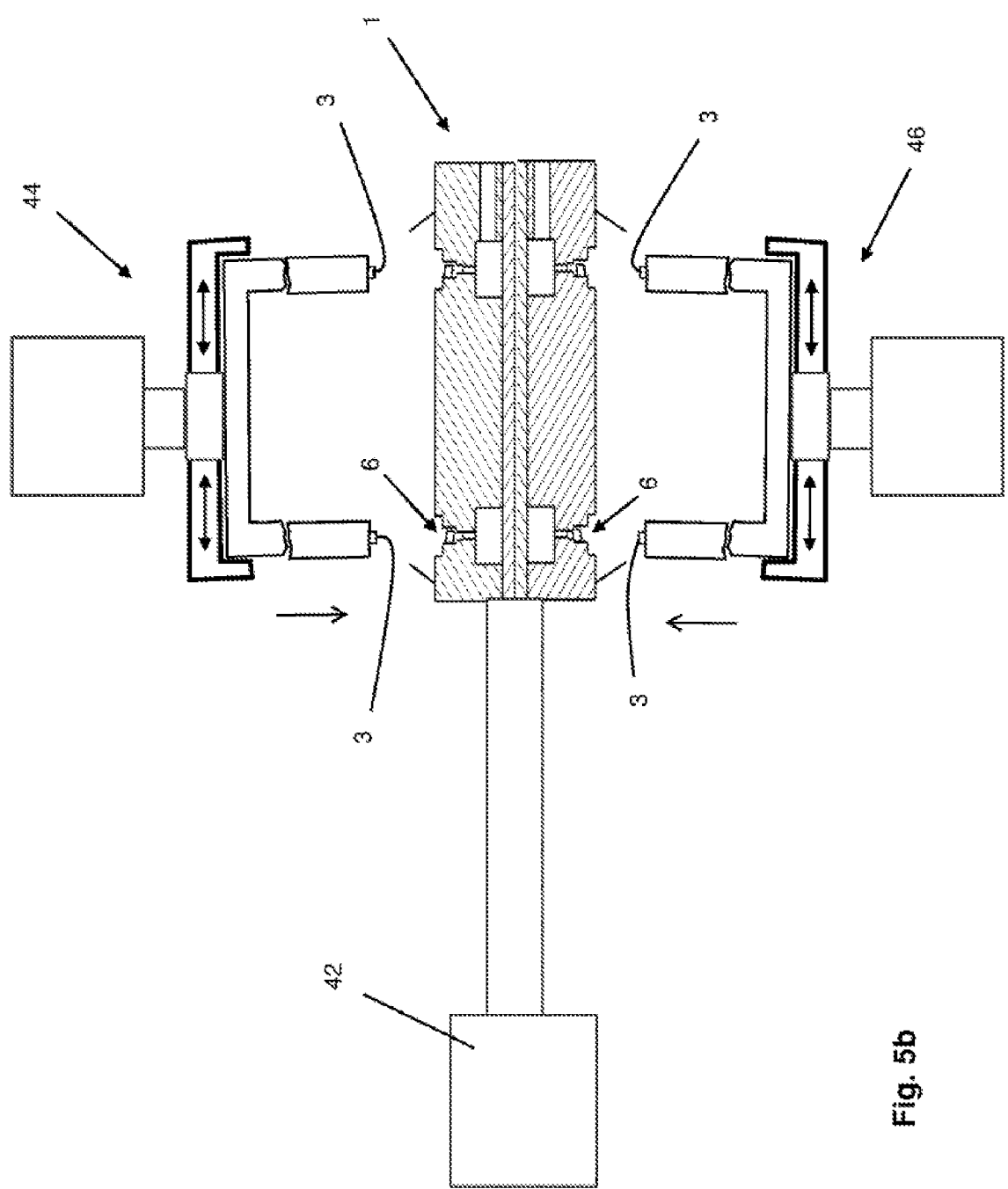

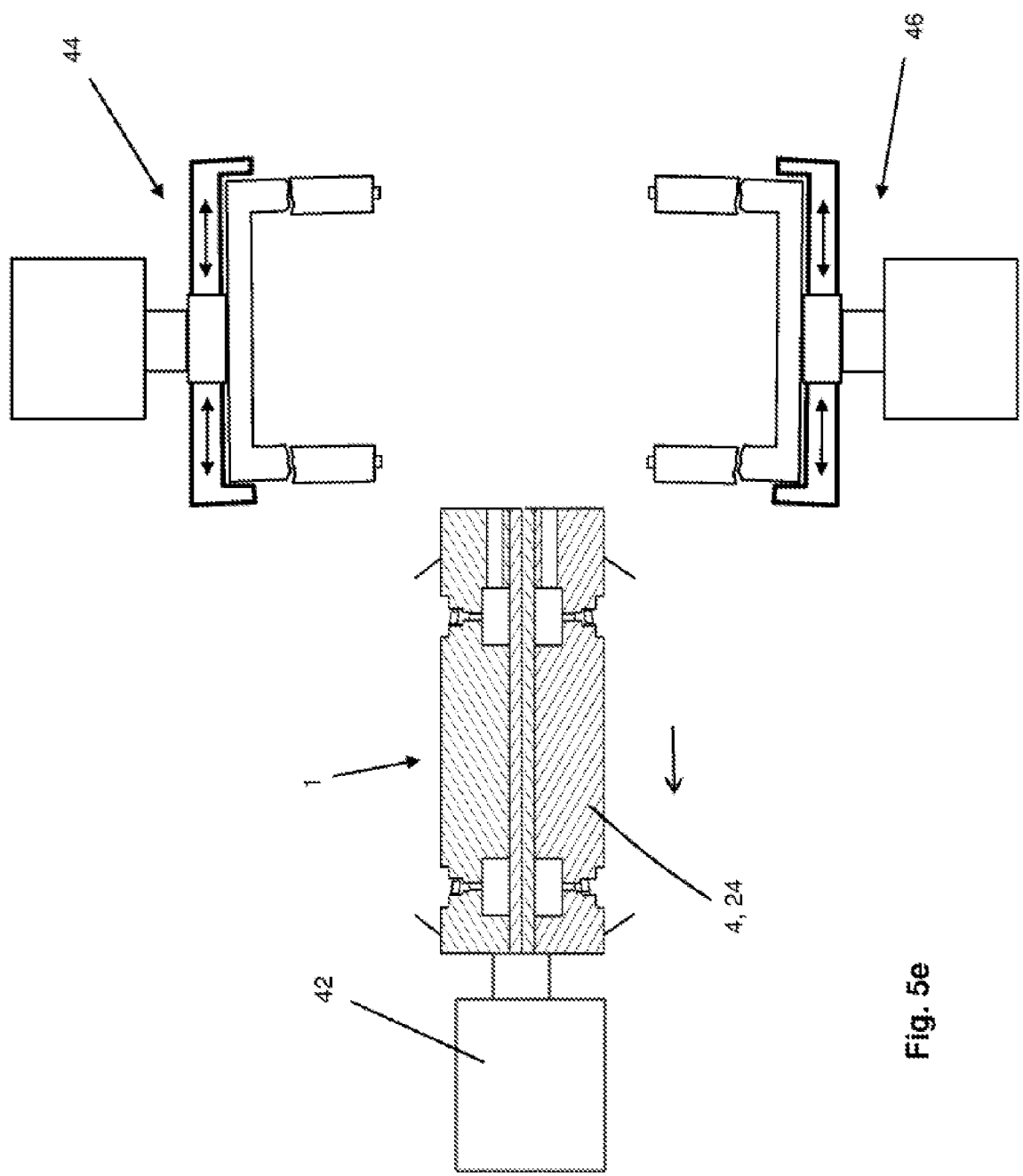

DEVICE FOR THERMALLY WELDING PLASTIC PARTS, AND ASSEMBLY CONTAINING A DEVICE OF THIS KIND

CROSS REFERENCE TO RELATED APPLICATION

This application claims priority to and the benefit of German Patent Application No. 10-2017-010550.2, filed on Nov. 11, 2017, and the WIPO Patent Application No. PCT/EP2018/080896, filed on Nov. 12, 2018, which are hereby incorporated by reference for all purposes as if fully set forth herein.

FIELD OF INVENTION

The present disclosure relates to a device for thermally welding plastic parts as well as an assembly containing such a device.

BACKGROUND

In order to weld workpieces made of thermoplastic such as, for example, flange connections on plastic tubes, it is known to use welding devices, which have a heating plate made of a thermally insulating material, in which a groove is formed, in which an electrically heated meandering strip-type metal foil is situated. To facilitate the welding process, the workpiece surface to be heated is positioned in close proximity to the heating element for a few seconds, and the workpiece with the heated workpiece surface is subsequently pressed, under pressure, against the complementary surface of the corresponding other workpiece, said surface being heated and melted in the same manner.

Oxidation of the plastic material may occur in the area of the heated workpiece surfaces due to the thermal energy, supplied as infrared radiation, of the foil heated to 600° C. for example, in conjunction with the oxygen present in the air; the oxidation of the plastic material can disadvantageously impact the stability of the welded connection.

In an attempt to counteract these problems, EP 1 415 789 B1 proposes a device for welding workpieces made of thermoplastic material, in which the workpiece surfaces to be welded are melted exclusively by a shielding gas and not by infrared radiation of a heating element, which, to this end, is heated to a temperature above the melting temperature of the plastic material. Even though the risk of oxidation of the plastic material is reduced by the shielding gas, the energy requirements and the quantity of shielding gas required are comparatively high, which leads to high operating costs for the device.

Therefore, a need exists for a device that welds two or more workpieces of thermoplastic together without the layer of oxidation. Accordingly, an object of the present disclosure is to obtain a device which enables oxidation-free welding of thermoplastic parts with low operating costs.

SUMMARY

Aspects of the present disclosure are to address at least the above-mentioned problems and/or disadvantages and to provide at least the advantages described below. Advantages are achieved according to the disclosure by means of a device for thermally welding workpieces, comprising a heating plate consisting of a thermally insulating material in which a first groove is formed, said first groove being provided with a first electrical heating element, for example a meandering strip-type metal foil or a resistance heating element, the first groove is configured to receive a surface of a workpiece to be welded, the workpiece may be a thermoplastic material, and positions the surface in close proximity to the first heating element, a first feed channel for introducing a shielding gas is formed in the heating plate and communicates with the first groove via at least one through-channel, and the first feed channel for supplying shielding gas can be connected to a shielding gas source via a feed line and a valve.

A further aspect of the disclosure is an assembly, with which two plastic parts made of a thermoplastic material can be automatically welded to one another with a high degree of precision and low operating costs.

This object is achieved according to the disclosure by means of an assembly having an assembly for welding a first and a second workpiece consisting of thermoplastic material, the assembly comprising a device according to any of the preceding claims, which is movable by a first actuator, and comprising a first movement device, which is movable by an actuator, for retaining and moving the first workpiece in a direction orthogonal as relates to the movement direction of the device, and a second movement device, which is moveable by an actuator, by means of which the second workpiece can be moved, in a direction orthogonal as relates to the movement direction of the heating plate, to the first workpiece and back again.

Additional features of the disclosure are described herein.

An advantage of the disclosure is that a very efficient heating of the plastic material occurs without the shielding gas itself being heated due to the heating of the plastic surfaces by the infrared radiation of the heating foils or heating elements.

In an additional aspect, a further reduction in the supplied quantity of shielding gas can be achieved in that the flange section of the plastic part to be heated lies on the upper side of the ceramic heating plate in an almost completely sealing manner. This is preferably on the upper and the lower side equipped with a corresponding circumferential groove, with heating elements designed as heating foils being inserted into said groove, said heating elements being designed as meandering or zigzagging heating foils, and into which the shielding gas is supplied via a circumferential, narrower groove positioned further inward, via through-channels. The through-channels may include nozzle holes having a circumferential feed channel.

BRIEF DESCRIPTION OF THE DRAWINGS

The disclosed embodiments are described in the following with reference to the figures.

The Figures Show the Following:

FIGS. 5a-5f is an assembly displaying the method steps implemented sequentially during welding of two plastic parts in order to indicate the respective positions of the heating plate and the movement devices for moving the two workpieces to be welded.

DETAILED DESCRIPTION

Figure 1:
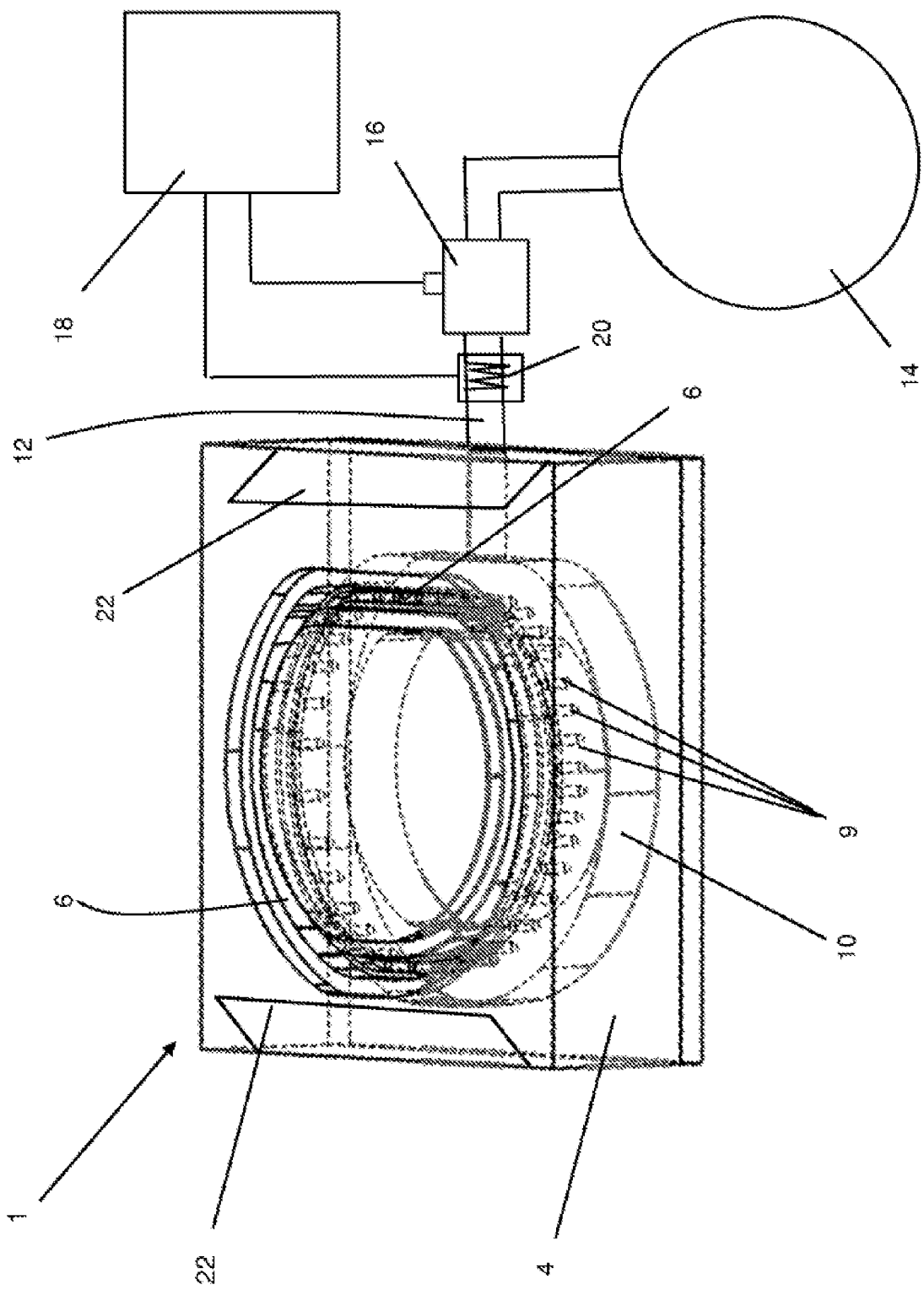
FIG. 1 is a schematic, semi-transparent view of the device according to the disclosure for illustrating the position of the feed channel, the through-channels, as well as the groove and the metal foil being retained therein within the ceramic plate, as well as additionally the connected shielding gas source, heating device, and valve with control device.
Figure 2:
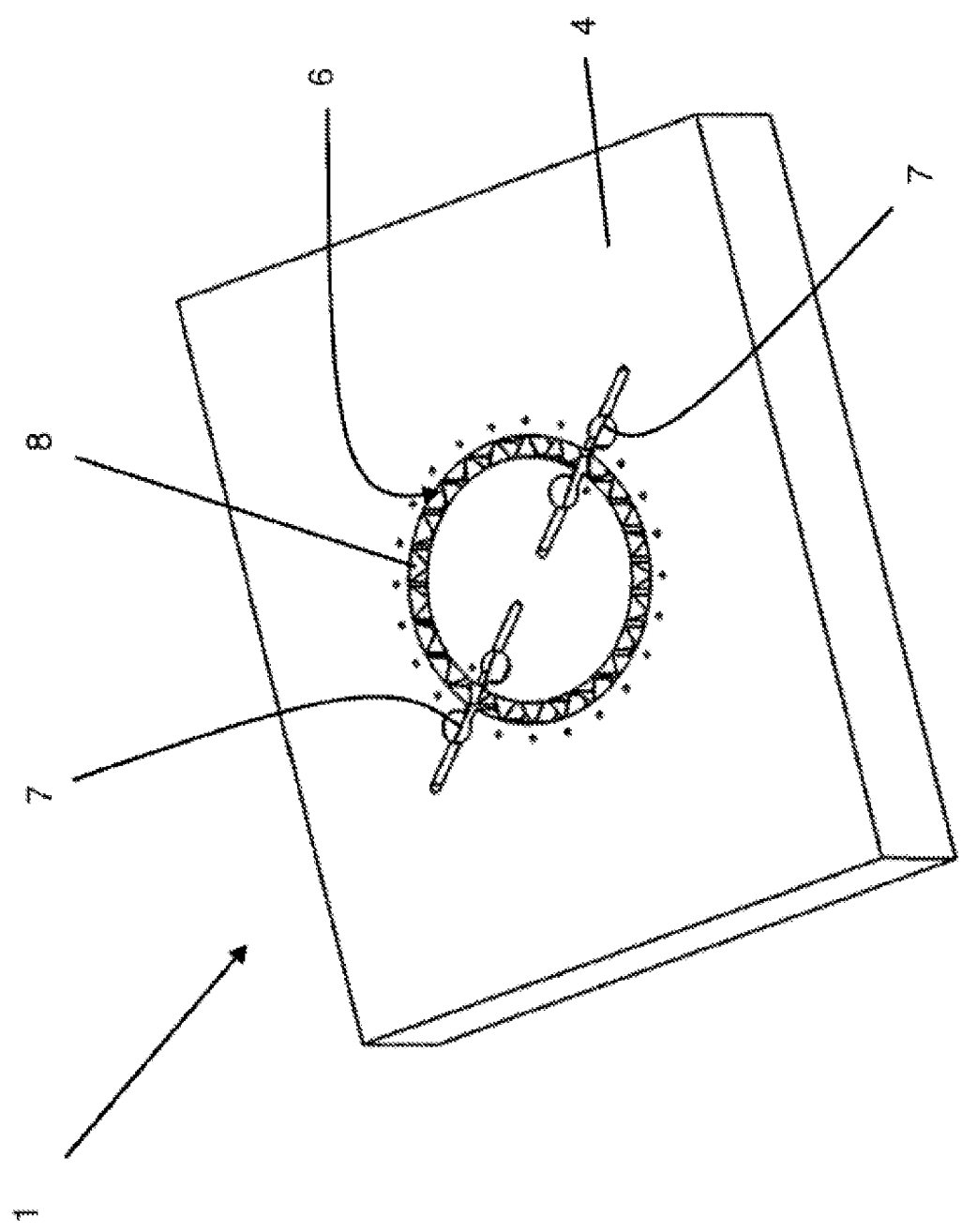
FIG. 2 is a top view of the heating plate with the groove formed therein and the metal foil used, as well as the electrical connections for supplying electrical energy to the metal foil.
Figure 3:
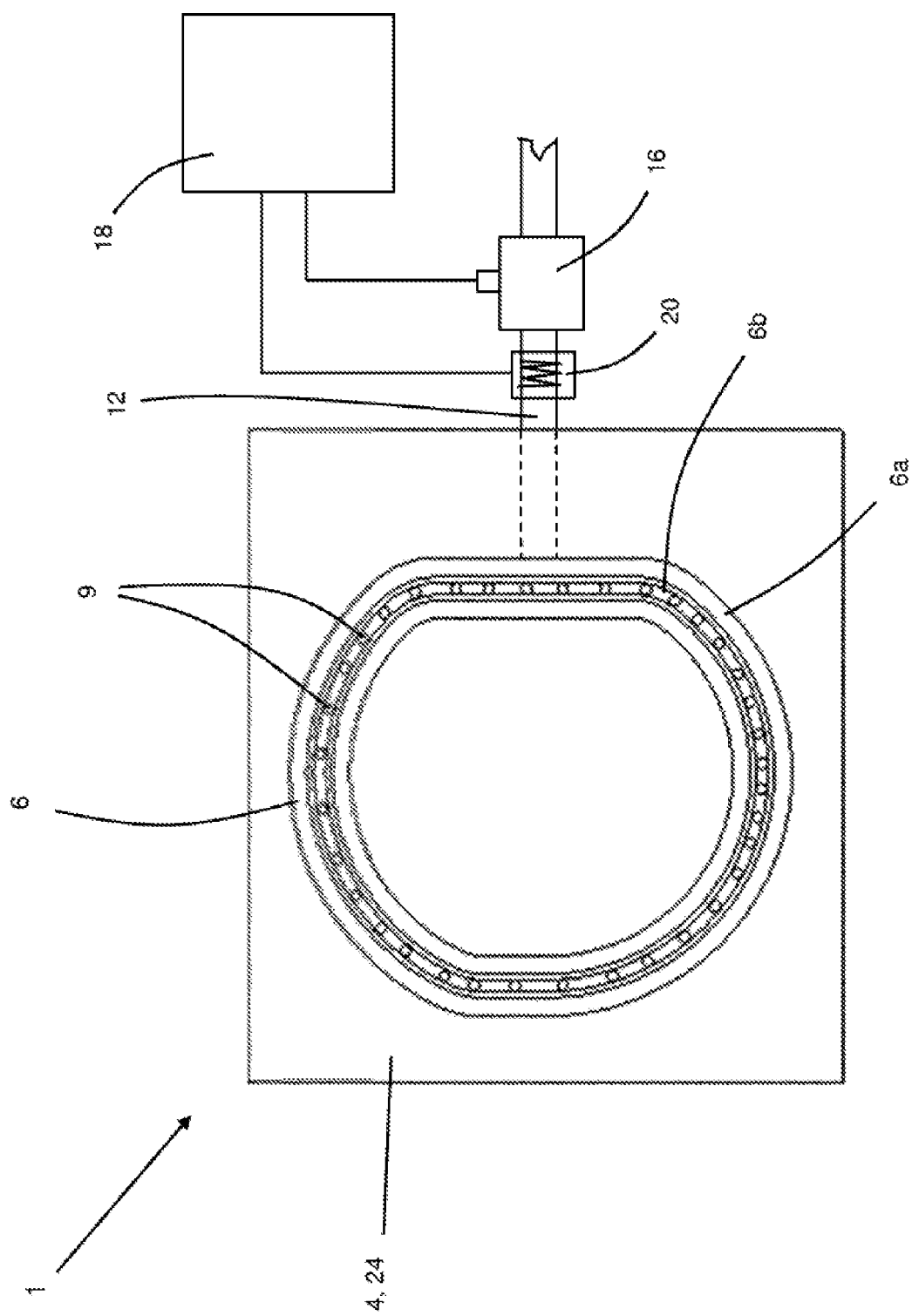
FIG. 3 is a schematic representation of the groove with the through-channels formed in the base of the groove.

As shown in FIGS. 1-4, a device 1 for thermally welding two workpieces 2a, 2b made of a thermoplastic material comprises a heating plate 4, as shown in FIGS. 2 and 3. The device includes a thermally insulating material, which may be a ceramic material. A groove 6 has been milled into the upper side of the heating plate 4, said groove having a shape which is adapted to the shape of the welding surface 3 to be heated of the workpiece 2a, 2b, for example a flange surface, and which normally has a consistent shape.

Figure 4:
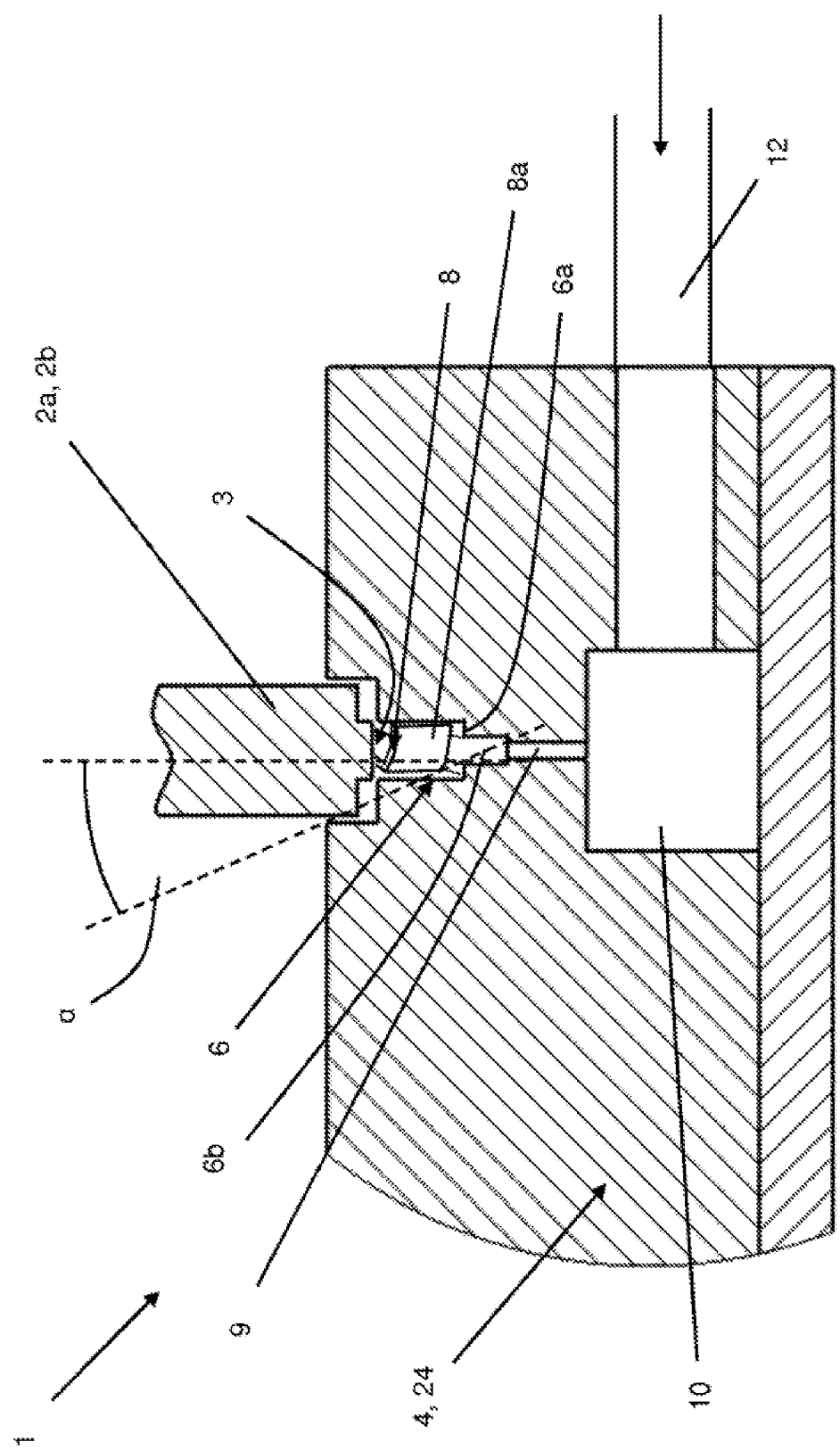
FIG. 4 is an enlarged schematic sectional view through the heating plate along the supply line for the shielding gas.

As is shown in detail in FIGS. 1, 2, and 4, an electrical heating element 8, which may be designed as a meandering, bent, strip-type metal foil, is used in the groove 6, said metal foil being connected to a current source, via electrical connection contacts 7 indicated in FIG. 2, in order to heat the metal foil electrically to a temperature of 600° C. for example.

Instead of the metal foil, it may likewise be provided that a heating element in the form of a known resistance heating element is incorporated in the groove 6, as is known, for example, from infrared radiators.

In order to heat the welding surfaces 3 of the workpiece 2a, 2b to be welded and thereby to melt the plastic material in the area of the surface, the plastic material is positioned, in an assembly 40 according to the disclosure, which is described in greater detail in the following, in close proximity to the heating element, i.e. in the direct vicinity above the heating plate 4, as is shown, for example, in FIG. 4.

To ensure that oxidation of the plastic material caused by oxygen in the air surrounding the heating plate is reduced to the extent possible during heating of the contact surface to be welded of the respective workpiece 2a, 2b, it is provided according to the disclosure that a feed channel 10 for a shielding gas is formed in the heating plate 4, said feed channel communicating with the groove 6, as shown in FIG. 4, via at least one of the through-channels 9 implemented as nozzle holes, i.e. connected according to the flow. According to the view from FIGS. 1, 3, and 4, the feed channel 10 is connected to a feed line 12, which is incorporated in the heating plate 4. The feed line 12 may be a linear, continuous hole. As is shown in FIG. 1, the feed line 12 is implemented, outside of the heating plate 4, i.e. outside of the ceramic material, as a conventional which is connected to a schematically indicated shielding gas source 14 via a valve 16. The feed line 12 may be a flexible supply line.

According to the view from FIG. 1, a heating element 20 is arranged in the feed line 12 from the shielding gas source 14 to the feed channel 10 with an embodiment of the disclosure, said heating element, for example, being implemented as an electric resistance heating element, which is connected to a current source by means of a control device 18, in order to preheat the supplied shielding gas, which is argon or nitrogen for example, to a temperature below the melting temperature of the plastic material. This results in the advantage that the shielding gas flowing away from the electric heating element 8, which is normally glowing, during the welding process and does not excessively cool down the heating element 8, whereby it is possible, in conjunction with the substantially constant preliminary temperature of the shielding gas, to adjust the thermal energy transferred to the welding surfaces 3 to be melted via the infrared radiation very precisely to a desired temperature, solely via the current flow in the heating element 8. A further advantage is that the heating element 20 in the feed line 12 for the shielding gas can be dimensioned any size in order to heat the shielding gas to the desired preliminary temperature of 230° C. for example, which makes it possible to use comparatively economical expansive heating elements due to the large amount of space outside of the heating plate.

A further advantage resulting from this embodiment of the disclosure is that, due to the shielding gas heated by the heating element 20 in the feed line 12, additional thermal energy is supplied to the welding surface 3 to be heated, which means that the radiation output, which must be output by the heating element 8 in the groove 6, can be significantly reduced as compared to devices in which exclusively heating elements are used which are not impacted by a shielding gas. In other words, the heating capacity of the electric heating element 8 in the groove 6 can be reduced in an advantageous manner by the shielding gas as an additional heat carrier, which leads to an advantageous increase in the service life of the heating element.

As shown in FIG. 1 in detail, the heating element 20 and also the valve 16 can be actuated by one and the same electronic control device 18, which, to this end, may contain a microcontroller for example.

According to a further concept of the disclosure, as indicated in FIG. 1, spoiler-type air control elements 22 may be arranged on the upper side and/or the lower side of the heating plate 4. This prevents ambient air from flowing into the groove 6 unimpeded and displacing the shielding gas contained therein from said groove during movement of the heating plate 4, or even the entire device 1, by means of a first actuator 42, in an assembly 40 as shown in FIGS. 5a-5f. As an alternative to the two air control elements 22 shown individually in FIG. 1, it may likewise be provided to surround the entire circumferential groove 6 with a spoiler-type air control element 22 designed in a ring-shape, said air control element protruding 18-20 mm, for example, beyond the groove 6 in the vertical direction. As seen from the top view, the upper edge of the air control element(s) 22 is situated outside of the edge of the circumferential groove 6 in the radial direction, such that sufficient space remains to lower the welding surface 3 to be heated of the respective workpiece 2a, 2b from above, over the groove 6 and the heating element 8 contained therein.

Alternatively, it may be provided that, according to an embodiment of the disclosure in the figures, the entire upper side of the heating plate 4 may be covered by one or more cover elements in the area of the groove 6 to the extent that escaping of shielding gas is completely suppressed. When the terms upper side and lower side are discussed in this context, it means that when there is a pairwise assembly of two grooves 6 within one heating plate 4, as is shown in the assembly from FIGS. 5a-5f, both the groove 6 on the upper side of the heating plate 4 and the groove 6 on the lower side of same can be covered by a corresponding cover element, in order to prevent unintentional escaping of shielding gas in those method steps of the welding process in which the grooves 6 are not covered by the welding surfaces 3 of the workpiece 2a, 2b to be welded.

Providing one or more cover elements, which may be implemented, for example, as a disk-shaped cover, which may be pivoted over the corresponding groove 6 by means of a separate drive or also by means of an actuating force derived from the movement of the heating plate, results in the advantage that the required quantity of shielding gas can be notably reduced, particularly when the valve 16 is likewise closed by the control device 18 in the phases in which the grooves 6 are closed, and the heating element 20 in the feed line 12 has the power switched off or is being operated with reduced electrical power.

In this case, it is understood that the valve 18 in the simplest case may be an on/off valve, which is closed or opened by the control device 18. Alternatively, it is also possible that the valve 16 is a proportional valve, which can be moved into corresponding intermediate positions by the control device 18 to the extent that precise control of the quantity of supplied shielding gas is enabled.

Even though the feed channel 10 for the shielding gas with an embodiment of the disclosure is a circumferential annular channel as shown in the figures, which is only impacted with shielding gas from the shielding gas source 14 via the supply line 12 from one end, it may be provided according to a further embodiment of the disclosure in the figures, that the feed channel 10 is implemented as a non-continuous blind channel, into which the shielding gas is only supplied from one side, and which is closed on its other end by a wall, which is situated, for example, in a sub-area of the workpieces 2a, 2b to be joined, with there being no welding process in said sub-area due to a removed or repositioned section.

Even though the openings of the through-channels 9 may all have the same diameter over the length of the feed channel 10, it may be provided alternatively that the diameter of the through-channels 9 continuously expands in the feed channel 10, starting from the mouth of the supply line 12, in order to compensate for the pressure drop within the feed channel 10. With the embodiment of a circumferential feed channel 10 as shown in the figures, the through-holes or, in general, the through-channels 9 with the largest opening diameters are disposed, in an advantageous manner, on the side of the substantially annular circumferential channel 10, as viewed from the top, which is opposite the mouth of the supply line 12.

In an embodiment of the disclosure, the heating element 8 may comprise a meandering or zigzagging metal strip, which may be a metal foil, having a plurality of adjacent flat outer sections 8a that are held upright in the groove 6. The feed channel 10 for the shielding gas in this case may extend parallel to the groove 6 in the part of the heating plate 4 situated further inward such that the planar, flat outer sections 8a are supported on the base 6a of the groove 6 and extend, at least partially, above the through-channels 9, as is shown in FIG. 4. This embodiment likewise includes a further circumferential distribution channel 6b for the shielding gas, which may extend in the center of the groove 6, and which has less width than the groove 6, and into which the through-channels 9 empty from below, as is shown schematically in FIG. 4. The use of such a distribution channel 6b, the width of which, for example, amounts to half the width of the groove 6, results in the advantage that the meandering or zigzagging heating elements 8 can be supported with their lower side on the base 6a of the groove 6, and that shielding gas flows, homogenously to the extent possible, around the meandering or zigzagging heating element 8 over its entire length. The heating element 8 thereby has a practically homogenous temperature during operation, which ensures the most extensive homogenous heating possible of the welding surfaces 3 by means of the radiated infrared radiation.

In order to reduce a transfer of energy from the electric heating element 8 to the supplied shielding gas to the extent possible, which can lead to undesirable cool-down of the heating element 8 by means of convection, the vertical, planar, flat outer sections 8a of the meandering or zigzagging electric heating elements 8 in the circumferential groove 6 may be subjected to flow via the through-channels 9 underneath to the extent that the shielding gas impacts the planar, flat outer section 8a of the heating element 8 at an angle α of less than 45°. In an additional embodiment, the angle α may be less than 20° or less than 5°. The meandering or zigzagging metal foils arranged upright in the groove 6 are subjected to flow by means of through-channels 9, which are situated directly below the lower edge of the metal foils and the longitudinal axes of which extend parallel to the planar, flat outer sections 8a, arranged upright in the groove 6, of the heating elements 8, i.e. they have an angle α of 0°.

Figure 5C:
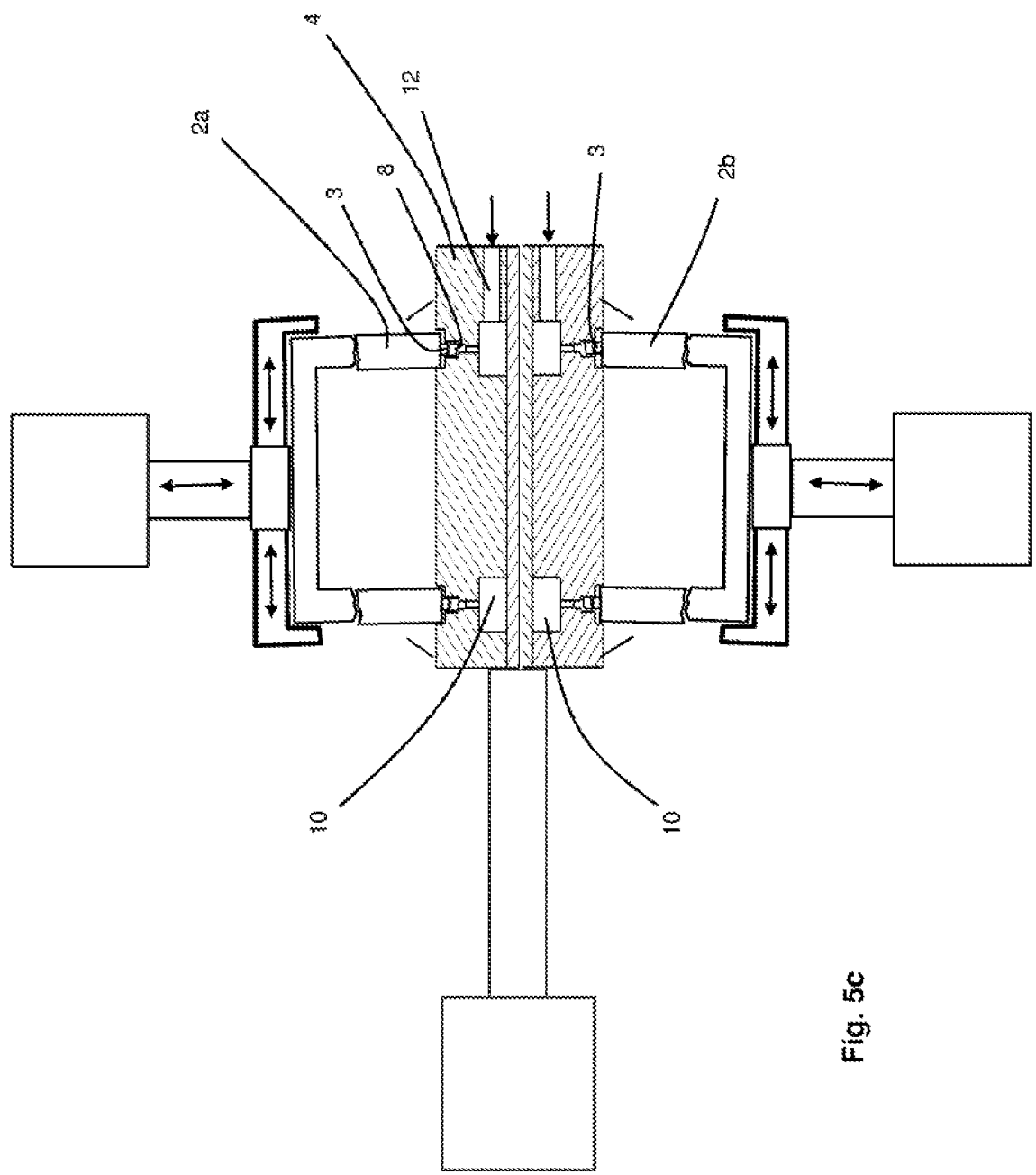

As is further shown in FIG. 5a, the heating plate 4 used in an assembly 40 (as shown in FIGS. 5a-5f) for welding two thermoplastic workpieces 2a, 2b is preferably made of ceramic. The heating plate 4 comprises a flattened cuboid base body 24, and on the opposite upper and lower sides. Each side has at least one heating element 8 accommodated in a corresponding groove 6, wherein the heating element 8 can be impacted with shielding gas from the shielding gas source 14 via a respective feed channel 10. Even though the supply lines 12 and feed channels 10 for the shielding gas are designed as separate channels in the device 1 shown in FIGS. 5a-5f, alternate embodiments may provide only one single closed circumferential feed channel 10 or even a feed channel formed as a blind channel that is impacted with shielding gas via only one single supply line 12. By means of this arrangement, the groove 6 arranged on the upper side and the groove on the lower side of the heating plate 4 are impacted with shielding gas via the corresponding through-channels 9. Such a base body 24 can thereby be obtained, for example, in that two open heating plates 4 on the lower side, as they are shown in FIG. 4, are joined together back-to-back, wherein the supply line 12 is only formed in one of the plates.

An embodiment of an assembly 40 according to the disclosure for welding two workpieces 2a, 2b made of thermoplastic material is described, in which a device 1 is used. The device may include the previously described heating plate 4 with a base body 24, having a corresponding groove 6 arranged on the upper side and on the lower side of the heating plate 4. An electrical heating element 8 is accommodated in each groove 6, with each being impacted with shielding gas from a shielding gas source, via a corresponding feed channel 10 on the inside.

In order to weld together a first and a second workpiece 2a, 2b shown in FIG. 5a at the welding surfaces 3, the device 1 according to the disclosure may be accommodated in a first actuator 42, such as, for example, a hydraulic or pneumatic cylinder or even some other type of linear drive. The first workpiece 2a is accommodated in a first movement device 44, such as, for example, a schematically indicated gripper and a linear drive, e.g. a pneumatic or hydraulic cylinder. Moreover, the second workpiece 2b may be held in a second movement device 46, which is designed identically to the first movement device 44 and which likewise comprises a schematically indicated gripper, which is accommodated in a corresponding linear drive. The actuator 42 as well as also the first and the second movement device, 44 and 46, are actuated via a central control device, which may particularly be the control device 18 shown in FIG. 1, which also controls the valve 16 and the heating element 20.

In the starting position shown in FIG. 5*a*, both the actuator 42 and the first and second movement device 44, 46 are situated in the retracted position, for example, directly after the first and the second workpiece 2*a*, 2*b* are picked up by the first and the second movement device 44, 46.

In the subsequent method step of the welding method according to the disclosure, which is shown in FIG. 5*b*, the actuator 42 is moved from the retracted position into the extended position and hereby moves the heating plate 4 of the device 1 according to the disclosure into a position, in which the welding surfaces 3 are aligned flush with the grooves 6 but are still situated, however, a distance, for example, of 50 mm or more away from said grooves.

In the method step of the welding method according to the disclosure following this, which is shown in FIG. 5*c*, the workpieces 2*a*, 2*b* are moved in the direction of the upper side and lower side of the heating plate 4 by the corresponding movement devices 44, 46, until the welding surfaces 3 are each situated in close proximity, e.g. 0.5-1 mm, to the heating element 8 arranged in the respective groove 6. Said heating element is connected to a current source at its electrical connection contacts 7 and thereby heated to a temperature of 600° C. for example. Simultaneously, shielding gas is routed from the shielding gas source 18 into the supply lines 12 and the feed channel 10 or feed channels 10 through valve 16, as is indicated by the arrows, which are not further characterized, in FIG. 5*c*, to the extent that the welding surfaces 3 of the workpieces 2*a*, 2*b* are heated to the melting temperature of the plastic material by the infrared radiation of the heating elements 8 under the effect of a shielding gas atmosphere.

Figure 5D:
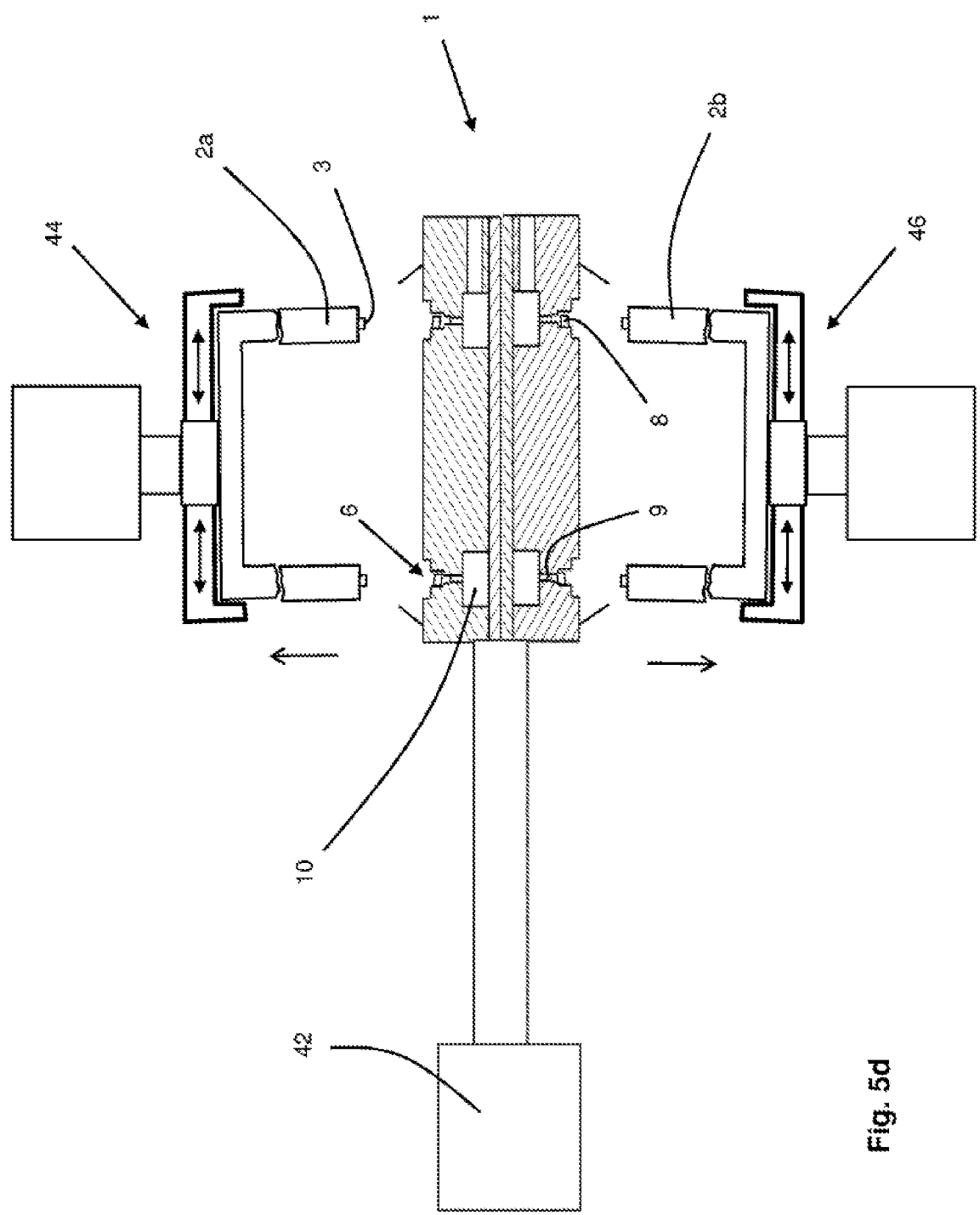
Figure 5F:
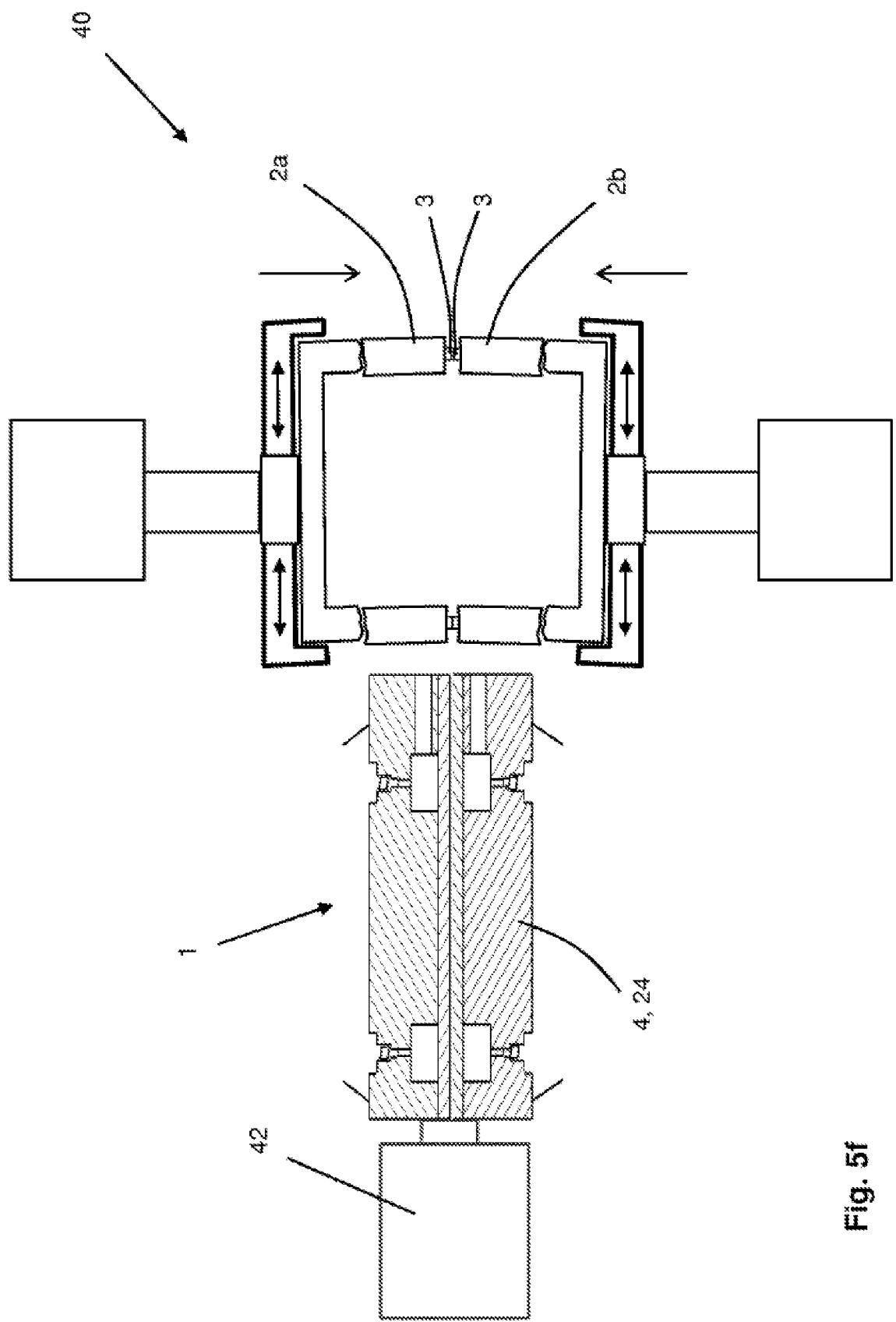

Once the welding surfaces 3 have been heated to the required melting temperature of the plastic material by the infrared radiation of the heating elements 8 as well as the shielding gas preheated by a heating element 20 in the supply line 12 (cf. FIGS. 1 and 3), the first and the second movement device 44, 46 with the heated first and second workpieces 2*a*, 2*b* accommodated thereupon are moved back into the retracted position shown in FIG. 5*d*, and the heating plate 4, or the device 1, is moved in the direction of the arrow between the first and the second workpiece 2*a*, 2*b* by the first actuator 42, as is shown in FIG. 5*e*. In the method step of the welding method according to the disclosure shown in FIG. 5*f*, the first workpiece 2*a* and the second workpiece 2*b* are subsequently moved toward one another, via the heat-up position shown in FIG. 5*c*, by means of the corresponding first or second movement device 44, 46, until the melted welding surfaces 3 of the first workpiece 2*a* are resting against the likewise melted welding surfaces 3 of the second workpiece 2*b*. By means of exertion of a specified press-on pressure, the two workpieces 2*a*, 2*b* are held together in this welding position shown in FIG. 5*f* until the plastic material has re-solidified and the two workpieces 2*a*, 2*b* are joined as a single workpiece.

The thusly formed end product can then be supplied for further processing by opening the respective gripper of the first and second movement device 44, 46.

Figure 6:
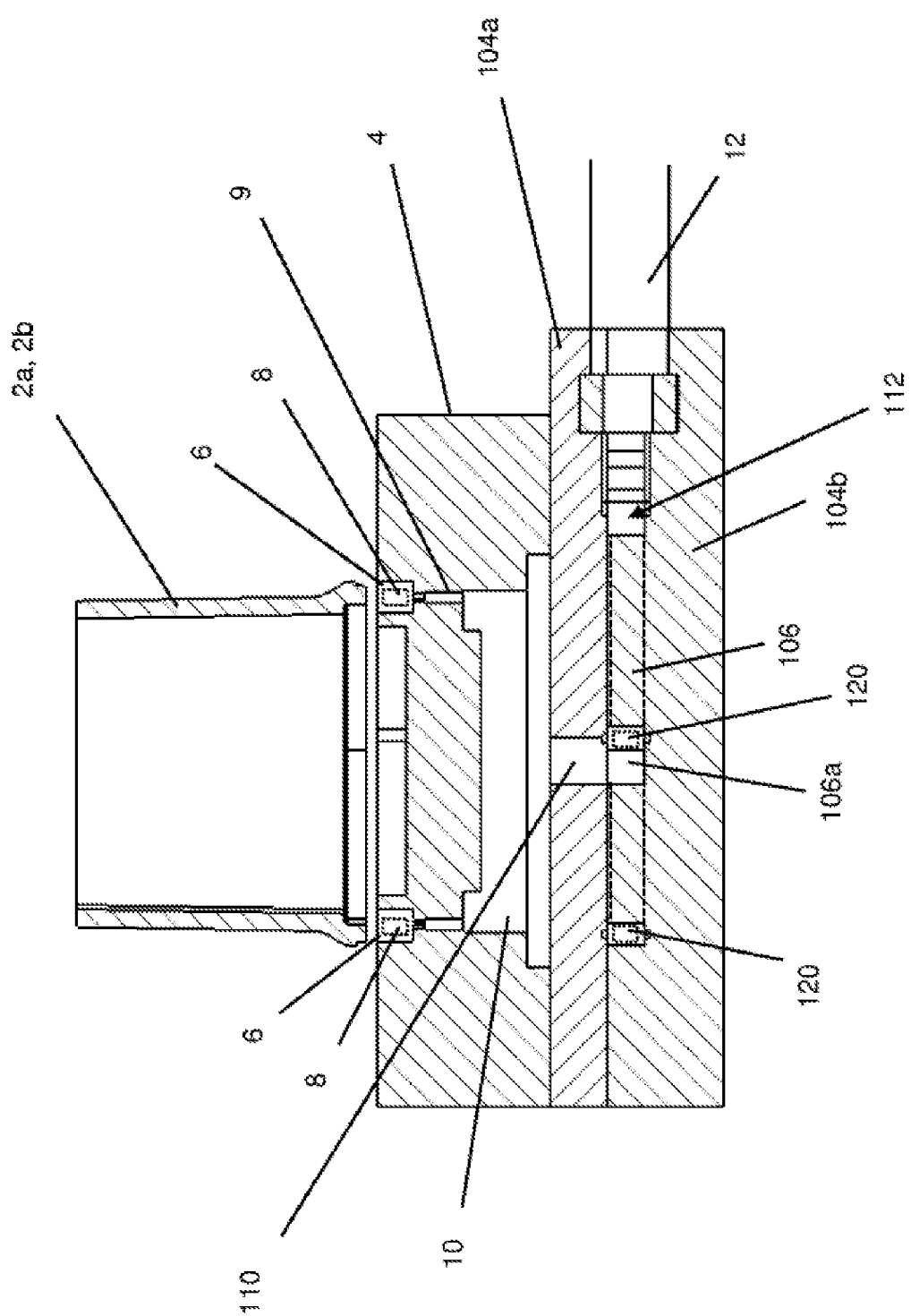
FIG. 6 is a schematic sectional view of an embodiment of the device according to the disclosure, in which, on the side of the heating plate opposite the groove, an intermediate plate as well as a base plate covering said intermediate plate is arranged with a further groove, in which a further heating element is situated for preheating the shielding gas.
Figure 7:
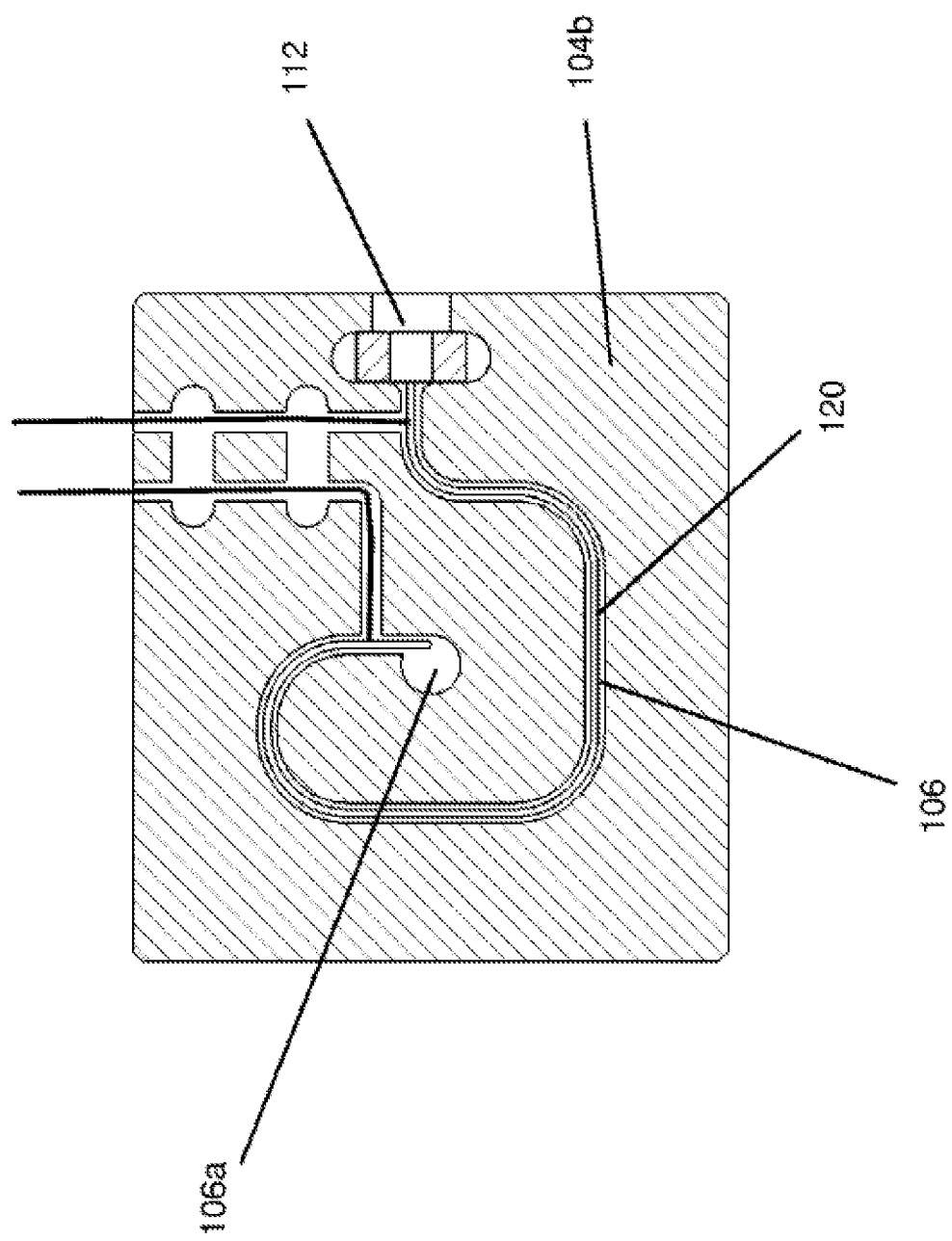
FIG. 7 is a view of the base plate with the further groove incorporated therein and the further heating element used.
Figure 8:
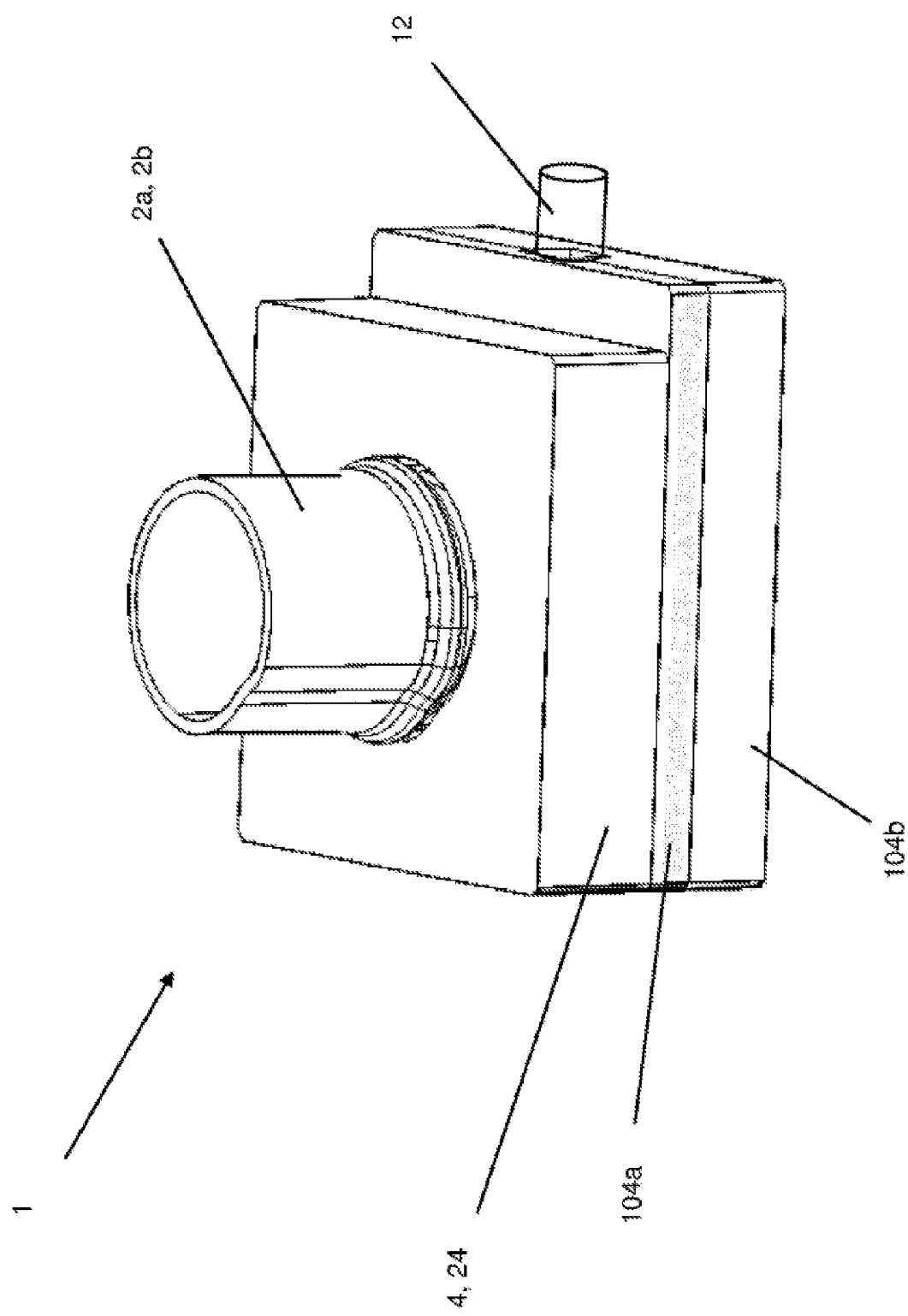
FIG. 8 is a schematic, spatial view of the further embodiment with a joined sandwich made of the heating plate, intermediate plate, and base plate.

According to a further embodiment of the device 1 according to the disclosure as shown in FIGS. 6 to 8, an intermediate plate 104*a* and a base plate 104*b* adjacent the intermediate plate 104*a* are arranged on the side of the heating plate 4 opposite the groove 6. The base plate 104*b* and the intermediate plate 104*a* are designed in a cuboid shape and are pushed together, e.g. by screws, in a planar and gas-tight manner to the extent that the sandwich as shown in FIGS. 6 and 8 results. A further groove 106, in which a further heating element 120 is accommodated for preheating the shielding gas, is formed in the base plate 104*b*. The further groove 106 is covered by the intermediate plate 104*a* with the formation of a further feed channel 112, which is impacted with shielding gas from the shielding gas source 14 upstream via the supply line 12, as has previously been described in connection with the embodiment shown in FIG. 1. As seen in the representation from FIGS. 6 and 7, a supply hole 110 is formed in the intermediate plate 104*a*, by means of said supply hole the downstream end of the further feed channel 110 communicates with the feed channel 10 for the shielding gas in the heating plate 4.

As is furthermore indicated in FIGS. 6 and 7, the further groove 106 has an expanding section 106*a* on its downstream end, said section communicating with the supply hole 110 in the intermediate plate 104*a*, in order to move the shielding gas which was preheated by the further heating element 120 from further feed channel 112 into feed channel 10, by means of which it reaches the groove 6 via the through-channels 9.

This embodiment has the advantage that the thermal energy, which is supplied to the shielding gas via the further heating element 120 and the further feed channel 112, is stored in the intermediate plate or the base plate 104*b*, which is especially thereby facilitated when they are produced from ceramic material.

The further heating element 120 is also an electrical heating element, which is a meandering strip-like metal foil or alternatively a known resistance heating element, e.g. a spirally wound heating wire, especially in the same manner as the heating element 8 in the groove of the heating plate 4. As indicated in FIG. 7, the ends of the further heating element 120 may be connected to a current source, which is not shown, via electrical supply lines, with said current source advantageously being the current source which is used for heating the heating element(s)8 in the groove 6 of the heating plate 4.

Furthermore, with an embodiment of the disclosure, the feed channel 10 for the shielding gas may be incorporated into the flat surface of the intermediate plate 104*a* adjacent the heating plate 4 as a recess, which is open toward the heating plate 4, wherein the heating plate 4 is formed substantially flatly on its side facing the intermediate plate 104*a* and only has the through-channels 9 communicating with the groove 6. This results in the advantage that the heating plate only has to be processed with a tool from one side in order to incorporate the groove 6 and the through-channels 9 into the heating plate, which prevents re-clamping of the heating plate during production. In addition, the feed channel 10 with this embodiment of the disclosure can be implemented, for example, as one single large recess, which supplies all of the through-channels 9 with smaller heating plates or is designed as a multipart recess, with as many parts as desired, designed with chambers communicating via radially extending grooves and channels, said chambers being arranged exclusively below the areas to be melted of a workpiece for large workpieces, in order to locally supply the through-channels. It is understood that the last-described embodiment, i.e. the sandwich comprising the heating plate 4, intermediate plate 104*a*, and the base plate 104b with the assembly 40 can be used as an alternative to the heating plate 4 shown in FIGS. 5a to 5e in order to utilize the advantages of a brief heat-up phase, precise temperature control, as well as less thermal losses of the embodiment described in FIGS. 6 to 8.

It should be understood that this description (including the figures) is only representative of some illustrative embodiments. For the convenience of the reader, the above description has focused on representative samples of all possible embodiments, and samples that teach the principles of the disclosure. The description has not attempted to exhaustively enumerate all possible variations. That alternate embodiments may not have been presented for a specific portion of the disclosure, or that further undescribed alternate embodiments may be available for a portion, is not to be considered a disclaimer of those alternate embodiments. One of ordinary skill will appreciate that many of those undescribed embodiments incorporate the same principles of the disclosure as claimed and others are equivalent.

LIST OF REFERENCE NUMERALS

1 Device according to the disclosure
2a First workpiece
2b Second workpiece
3 Welding surface
4 Heating plate
4O Upper side of the heating plate
4U Lower side of the heating plate
6 Groove
6a Base of the groove
6b Distribution channel
7 Electrical connection contacts
8 Heating element
8a Flat outer section of heating element
9 Through-channels
10 Feed channel for shielding gas
12 Feed line
14 Shielding gas source
16 Valve in feed line for the shielding gas
18 Control device
20 Heating element in feed line
22 Air control element
24 Base body of the heating plate
40 Assembly
42 First actuator for moving the device
44 First movement device which can be actuated by motor for moving the first workpiece
46 Second movement device which can be actuated by motor for moving the second workpiece
104a Intermediate plate
104b Base plate
106 Further groove in base plate
106a Expanded section of groove in base plate
110 Supply hole in intermediate plate
112 Further feed channel
120 Further heating element in groove in intermediate plate
α Angle at which the shielding gas impacts the flat outer section

The invention claimed is:

1. A device for thermally welding thermoplastic workpieces comprising:
   a heating plate composed of a thermally insulating material;
   a first groove formed in the heating plate, wherein said first groove is provided with a first electrical heating element adapted so that a thermoplastic workpiece surface to be welded can be positioned in close proximity to the first heating element;
   a first feed channel formed in the heating plate for introducing a shielding gas, wherein the first feed channel communicates with the first groove via at least one through-channel, wherein the first feed channel is adapted to be connected to a shielding gas source via a feed line and a valve;
   a second electrical heating element arranged in the feed line to heat the shielding gas supplied to the first feed channel; and
   wherein the first heating element has at least one planar, flat outer section and the at least one through-channel is arranged relative to the planar, flat outer section so that the shielding gas impacts the planar, flat outer section of the first heating element at an angle of less than 45°.

2. The device according to claim 1, wherein the first heating element comprises one of a meandering or zigzagging metal strip, having a plurality of adjacent flat outer sections disposed upright in the first groove, and wherein the first feed channel extends below the upright, flat outer sections such that the planar, flat outer sections are supported on a base of the first groove and extend at least partially above the through-channel.

3. The device according to claim 2, wherein the first groove can be temporarily closed off by a cover element during movement of the heating plate.

4. The device according to claim 3, further comprising:
   a valve arranged in the feed line and actuated by a control device to adjust a volume of shielding gas supplied to the feed line from the shielding gas source.

5. The device according to claim 4, wherein the first feed channel is a closed circumferential channel and wherein a plurality of through-channels are arranged along the first feed channel, whereby the first feed channel communicates with the first groove.

6. The device according to claim 5, further comprising an intermediate plate and a base plate adjacent the intermediate plate, which are arranged on a side of the heating plate opposite the first groove, and wherein a second groove formed in the base plate includes a third heating element arranged to preheat the shielding gas, and wherein the second groove is covered by the intermediate plate to form a second feed channel, and wherein a supply hole is formed in the intermediate plate, whereby the supply hole is in fluid communication with a downstream end of the second feed channel which is in fluid communication with the first feed channel for the shielding gas.

7. The device according to claim 6, wherein the third heating element is an electrical heating element, in the form of one of a meandering strip-like metal foil or a resistance heating element.

8. The device according to claim 7, wherein at least one of the intermediate plate and the base plate are produced from a ceramic material.

9. The device according to claim 8, wherein the first feed channel is a recess formed into a flat surface of the intermediate plate adjacent the heating plate and is open toward the heating plate, and wherein the heating plate is substantially flatly on a side facing the intermediate plate and wherein only the through-channels communicate with the first groove.

10. The device according to claim 6, wherein the second groove has an expanding section on a downstream end in fluid communication with the supply hole in the intermediate plate.

11. The device according to claim 10, wherein the heating plate is composed of a ceramic material and has a flattened cuboid base body on opposite sides thereof and at least one first heating element is accommodated in a corresponding first groove, which can be impacted with shielding gas via an assigned first feed channel.

12. The device according to claim 1,
wherein the shielding gas is heated to a temperature which is below a melting temperature of a thermoplastic used in the thermoplastic workpiece.

13. The device according to claim 1, further comprising:
a spoiler-type air control element arranged on at least one of an upper side and lower side of the heating plate, and arranged to direct ambient air away from the first heating element during a movement of the heating plate.

14. The device according to claim 1, wherein the at least one through-channel is arranged relative to the planar, flat outer section so that the shielding gas impacts the planar, flat outer section of the first heating element at an angle of less than 20°.

15. The device according to claim 1, wherein the at least one through-channel is arranged relative to the planar, flat outer section so that the shielding gas impacts the planar, flat outer section of the first heating element at an angle of less than 15°.

16. An assembly for welding a first thermoplastic workpiece and a second thermoplastic workpiece, said assembly comprising:
a first heating plate and a second heating plate arranged back to back, wherein the first is composed of a thermally insulating material and has a first groove formed in the first heating plate, and the second heating plate is composed of a thermally insulating material, wherein said first groove is provided with a first electrical heating element adapted so that a thermoplastic workpiece surface to be welded can be positioned in close proximity to the first heating element;
a heating plate actuator for moving the first and second heating plates in a longitudinal direction;
a first movement device, movable by a first actuator, for retaining and moving the first workpiece in a first orthogonal direction; and
a second movement device moveable by a second actuator, for retaining and moving the second workpiece in a second orthogonal direction;
a first groove formed in the first heating plate;
a first feed channel formed in the first heating plate for introducing a shielding gas, wherein the first feed channel communicates with the first groove via at least one through-channel, wherein the first feed channel is adapted to be connected to a shielding gas source via a feed line and a valve;
wherein the first orthogonal direction and second orthogonal direction are orthogonal to the longitudinal direction of movement of the first and second heating plates;
wherein the first movement device is adapted to move the first thermoplastic workpiece toward and away from the first heating plate and the second movement device is adapted to move the second thermoplastic workpiece toward and away from the second heating plate;
wherein in a first position the first and second heating plates are disposed in a space between the first thermoplastic workpiece and the second thermoplastic workpiece, and in a second position the first and second heating plates are outside of the space;
a second electrical heating element arranged in the feed line to heat the shielding gas supplied to the first feed channel; and
wherein the first heating element has at least one planar, flat outer section and the at least one through-channel is arranged relative to the planar, flat outer section so that the shielding gas impacts the planar, flat outer section of the first heating element at an angle of less than 45°.

* * * * *